Patented Mar. 28, 1944

2,345,036

UNITED STATES PATENT OFFICE 2,345,036

MERCERIZING PENETRANT

Arthur De Castro, Newark, N. J., assignor to National Oil Products Company, Harrison, N. J., a corporation of New Jersey No Drawing. Application July 18, 1941, Serial No. 403,070

6 Claims. (Cl. 8—127)

This invention relates to improved mercerizing liquors, and more particularly to a novel penetrant for incorporation into mercerizing liquors and to correlated improvements in mercerizing baths.

It is common practice in the mercerizing art to accelerate the penetration of the mercerizing liquors by means of certain surface-active agents in order to speed up the process and to insure uniform and level mercerization. As surface active agents for this purpose there have been proposed the various hydrogenated aromatic substances; higher alcohols, secondary and tertiary amino-acids, aromatic sulfonates and other like substances. There have also been proposed as surface-active agents for mercerizing processes the lower phenols, such as phenol, the xylenols, the cresols and halogen derivatives thereof, usually in combination with other penetrating agents such as hydrogenated aromatic compounds, terpineols, tertiary amine oxides, fatty acid amides and the like. Finally, there have been proposed the use, in conjunction with lower phenols, of phenols with a plurality of short chain alkyl substituents, such as thymol and carvacrol, and of phenols with a single long-chain alkyl substituent such as octyl phenol. All of the above surface active agents are subject to certain drawbacks, among which is the instability of mercerizing baths containing them, since these substances tend to evaporate and crystallize out of the baths and thereby lower the penetrating action. Further, in processes for regenerating the liquors, portions of these compounds are destroyed or inactivated.

Accordingly it is an object of this invention to provide a mercerizing penetrant which will form stable solutions in mercerizing liquors and which will not cloud, evaporate or be destroyed during the regeneration of the liquor.

It is a further object of this invention to provide a mercerizing penetrant which will wet out the fabrics to be mercerized in a rapid and more even manner than heretofore.

The above and other objects are achieved by this invention in a composition comprising a major portion of a lower phenol and a minor portion of a dialkylated phenol, wherein the alkyl groups contain from 4 to 6 carbon atoms, which composition, when added to a mercerizing bath, will dissolve therein to produce a stable liquid which has high wetting power which does not diminsh during use and storage.

Suitable lower phenols for use in this invention are chosen from phenols whose phenates are soluble in mercerizing liquors, e. g. phenol; the cresols; the commercial cresylic acids which are mixtures of para, meta and ortho cresols; the xylenols; the halogenated phenols, cresols and xylenols; and in general any phenolic compound, the only substituents of which are methyl groups or monoatomic substituents. The foregoing class of compounds is referred to herein as "lower phenols" and wherever this expression occurs it is to be construed as defining said class of compounds. The use of commercial cresylic acids in the penetrant of this invention is highly preferred. The wetting agent used in the penetrant of this invention is chosen from the class of dialkylated phenols, wherein the alkyl substituents contain from 4 to 6 carbon atoms, such as diamyl phenol, dibutyl phenol, dihexyl phenol, and phenols containing pairs of substituents chosen from butyl, amyl and hexyl groups. The nuclear positions of these substituents do not greatly affect the operation of the compounds, but the 2, 4 substituted phenols are preferred. The particular isomers of the butyl, amyl and hexyl substituent groups likewise are not critical, but those containiing tertiary groups are preferred. The commercially available dialkylated phenols are composed of phenols wherein the alkyl groups consist of primary, secondary and tertiary groups, the latter predominately. The proportion of lower phenols to the aforesaid dialkylated phenols in the penetrant is rather critical; the lower phenols should constitute from about 90% to 97%, preferably about 92%, of the mixture. Any higher proportion of the lower phenols results in a diminished wetting-out action, and a lower proportion results in the formation of turbidity in the mercerizing liquor. The mixed phenols may be added to the mercerizing bath to the extent of about 0.3% to 2.0%, preferably about 1.0%.

Following are examples of procedures for making the penetrants of the applicant's invention, together with other examples for producing penetrants from which the applicant's invention is to be distinguished. All parts are given by weight.

*Example I*

|  | Parts |
| --- | --- |
| Commercial cresylic acid | 92 |
| Diamyl phenol | 8 |
| Caustic soda (32° Bé.) | 10,000 |

Mix the cresylic acid with the diamyl phenol and pour the mixture with stirring into the caustic soda solution. The resulting mercerizing liquor exerts a penetrating action far more rapid than any of the prior art mercerizing liquors and retains this property without diminution over long periods of time. Further, this liquor may be regenerated without loss of penetrating power.

*Example II*

| | Parts |
|---|---|
| Phenol | 92 |
| Diamyl phenol | 8 |
| Caustic soda (32° Bé.) | 10,000 |

Mix the phenol and diamyl phenol and pour the mixture into the caustic soda solution. The resulting mercerizing liquor exerts a powerful penetrating action, although not to the same degree as does the product in Example I. The product of this example is stable over a considerable period of time notwithstanding its haziness. A composition as above in which octyl phenol was substituted for diamyl phenol resulted in a dense milky mass which had a wetting time of over 5 minutes.

*Example III*

[To be distinguished from the present invention]

| | Parts |
|---|---|
| Commercial cresylic acid | 80 |
| Thymol | 20 |
| Caustic soda (32° Bé.) | 10,000 |

Mix the cresylic acid and thymol and pour with stirring into the caustic soda. The resulting mercerizing liquor has only a moderate wetting power, which power diminishes greatly upon standing. Further, the mercerizing solution becomes turbid and deposits crystals after the solution has been in use for about 24 hours.

*Example IV*

[To be distinguished from the present invention]

| | Parts |
|---|---|
| Commercial cresylic acid | 80 |
| Carvacrol | 20 |
| Caustic soda (32° Bé.) | 10,000 |

Mix the cresylic acid and thymol and pour into the caustic soda with stirring. The resulting mercerizing solution has only slight wetting power which decreases progressively. The solution begins to deposit crystals soon after it is made up.

*Example V*

[To be distinguished from the present invention]

| | Parts |
|---|---|
| Octyl phenol | 7 |
| Commercial cresylic acid | 93 |
| Caustic soda (32° Bé.) | 6,600 |

Mix the cresylic acid and octyl phenol and pour into the caustic soda. The resulting mercerizing liquor is initially a clear solution, but becomes cloudy within a few moments. The wetting power is moderately good when the solution is freshly made, but rapidly diminishes. The solution begins to cloud and deposit crystals almost immediately.

*Example VI*

[To be distinguished from the present invention]

| | Parts |
|---|---|
| Amyl phenol | 7 |
| Commercial cresylic acid | 93 |
| Caustic soda (32° Bé.) | 10,000 |

Mix the amyl phenol and cresylic acid and pour into the caustic soda. The resulting mercerizing liquor exerts a moderately high penetrating action which falls off gradually with time. The clarity of the liquor gradually diminishes, with eventual deposition of crystals.

Each of the mercerizing liquors produced in accordance with the above examples was examined and tested at intervals of 1 minute, 5 minutes, 1 hour, 5 hours and 24 hours, after its formation, the wetting time, according to the Draves' test, (see the "American Dyestuff Reporter" Volume 20, page 201, March 30, 1931, for a description of this test) and the clarity of the solution being noted at each time. Results of these tests are tabulated as follows:

| | Example No. | | | | | |
|---|---|---|---|---|---|---|
| | I | II | III | IV | V | VI |
| | Penetrants | | | | | |
| | Cresylic acids, diamyl phenol | Phenol, diamyl phenol | Cresylic acids, thymol | Cresylic acids, carvacrol | Cresylic acids, octyl phenol | Cresylic acids, amyl phenol |
| One minute test: | | | | | | |
| Wetting time | 2 secs | 12 secs | 85 secs | 125 secs | 20 secs | 65 secs. |
| Appearance | Clear | Hazy | Clear | Clear | Clear | Clear. |
| Five minute test: | | | | | | |
| Wetting time | 2 secs | 15 secs | 110 secs | 140 secs | 150 secs | 65 secs. |
| Appearance | Clear | Hazy | Clear | Crystals | Crystals | Clear. |
| One hour test: | | | | | | |
| Wetting time | 2 secs | 18 secs | 110 secs | 140 secs | 150 secs | 65 secs. |
| Appearance | Clear | Hazy | Clear | Crystals | Dense crystals | Clear. |
| Five hour test: | | | | | | |
| Wetting time | 2 secs | | 128 secs | 150 secs | 160 secs | 85 secs. |
| Appearance | Clear | | Clear | Crystals | Cloudy, crystals | Crystals. |
| Twenty-four hour test: | | | | | | |
| Wetting time | 3 secs | | 135 secs | 155 secs | 120 secs | 90 secs. |
| Appearance | Clear | | Crystals | Crystals | Cloudy, separation | Crystals. |

From the above table it will be seen that even when all the solutions are freshly made, the mercerizing liquor made according to the applicant's Example I is very much superior in wetting power to any of the products of Examples III to VI. For instance, in the one minute tests the product of Example I had a Draves' wetting time of 2 seconds, whereas the best wetting power observed for the other examples is 20 seconds for Example V. After 5 minutes, the product of Example I maintained a wetting time of 2 seconds, whereas the product of Example VI possessed a wetting time of 65 seconds. At the end of 24 hours all of the mercerizing liquors prepared in accordance with Examples III to VI had so diminished in wetting power, and had become so clouded and sedimented as to be commercially worthless, while the product according to Example I maintained a wetting power of 3 seconds and continued clear and unsedimented. The same desirable features will be noted in connection with Example II, though to a smaller degree. There is thus provided by this invention a mercerizing penetrant which is very much more stable and more powerful in its action than the mercerizing penetrants heretofore proposed.

Since certain changes may be made in the above composition of matter and different embodiments of the invention could be made without departing from its scope, it is intended that all matter contained in the above description shall be interpreted as illustrative and not in a limiting sense.

Having described my invention, what I claim as new and desire to secure by Letters Patent, is:

1. A mercerizing penetrant comprising 90% to 97% of a lower phenol and 10% to 3% of a dialkylated phenol in which the alkyl groups each contain from 4 to 6 carbon atoms.

2. A mercerizing penetrant comprising 90% to 97% of commercial cresylic acid and 10% to 3% of a dialkylated phenol in which the alkyl groups each contain from 4 to 6 carbon atoms.

3. A mercerizing penetrant comprising 90% to 97% of phenol and 10% to 3% of a dialkylated phenol in which the alkyl groups each contain from 4 to 6 carbon atoms.

4. A mercerizing penetrant comprising 90% to 97% of commercial cresylic acid and 10% to 3% of a diamyl phenol.

5. A mercerizing bath comprising 98% to 99.7% of aqueous caustic soda and 2% to 0.3% of a mercerizing penetrant, said penetrant being composed of 90% to 97% of a lower phenol and 10% to 3% of a dialkylated phenol in which the alkyl groups each contain from 4 to 6 carbon atoms.

6. A mercerizing bath comprising 98% to 99.7% aqueous caustic soda, 2% to 0.3% of a mercerizing penetrant, said penetrant being composed of 90% to 97% commercial cresylic acid and 10% to 3% of a diamyl phenol.

ARTHUR DE CASTRO.